United States Patent [19]

Sampsell

[11] Patent Number: 4,954,789
[45] Date of Patent: Sep. 4, 1990

[54] SPATIAL LIGHT MODULATOR
[75] Inventor: Jeffrey B. Sampsell, Plano, Tex.
[73] Assignee: Texas Instruments Incorporated, Dallas, Tex.
[21] Appl. No.: 413,924
[22] Filed: Sep. 28, 1989
[51] Int. Cl.$^5$ .............................................. G02B 26/08
[52] U.S. Cl. .................................... 330/4.3; 350/487; 350/6.6
[58] Field of Search ................ 350/6.5, 6.6, 269, 356, 350/486, 487; 358/206, 208; 332/7.51

[56] References Cited
U.S. PATENT DOCUMENTS

| | | | |
|---|---|---|---|
| 1,789,521 | 1/1931 | Feingold | 358/206 |
| 3,746,911 | 7/1973 | Nathanson et al. | 358/206 |
| 3,886,310 | 5/1975 | Guldberg et al. | 350/360 |
| 4,492,435 | 1/1985 | Banton et al. | 350/487 |
| 4,566,935 | 1/1986 | Hornbeck | 156/626 |
| 4,596,992 | 6/1986 | Hornbeck | 346/76 |
| 4,615,595 | 10/1986 | Hornbeck | 353/122 |
| 4,662,746 | 5/1987 | Hornbeck | 350/269 |
| 4,698,602 | 10/1987 | Armitage | 350/356 |
| 4,710,732 | 1/1987 | Hornbeck | 332/7.51 |
| 4,842,396 | 6/1989 | Minouka et al. | 350/6.5 |

OTHER PUBLICATIONS

"Miniature Components Carved from Silicon May be used as Microsensors and Valves", Electronics, May 17, 1984, pp. 82–83.
Florence et al., "Operation of a Deformable Mirror Device as a Fourier Plane Phase Modulating Filter", 938 SPIE, 1988, pp. 2–10.
Horner et al., "Phase-Only Matched Filtering", 23 Appl. Optics 812, 1984.

Primary Examiner—Nelson Moskowitz
Attorney, Agent, or Firm—Melvin Sharp; James T. Comfort; Carlton H. Hoel

[57] ABSTRACT

An electrostatically deflectable plate spatial light modulator with light reflecting plates (106) composed of aluminum alloy and with symmetrically located supporting hinges (108) connecting the plates (106) to support posts (104); this provides a thick stiff plate and a thin compliant hinges with deflection perpendicular to the plane of the plates.

6 Claims, 8 Drawing Sheets

SPATIAL LIGHT MODULATOR

CROSS-REFERENCE TO RELATED APPLICATIONS

The following copending applications disclose related subject matter: Ser. Nos. 159,466, filed Feb. 19, 1988, 43,740, filed Apr. 29, 1987, and 168,724, filed Mar. 16, 1988. These cross referenced applications are assigned to the assignee of this application.

BACKGROUND OF THE INVENTION

The present invention relates to spatial light modulators (light valves), and, more particularly, to spatial light modulators with pixels formed of electrostatically deflectable beams.

Spatial light modulators (SLM) are transducers that modulate incident light in a spatial pattern corresponding to an electrical or optical input. The incident light may be modulated in its phase, intensity, polarization, or direction, and the light modulation may be achieved by a variety of materials exhibiting various electrooptic or magnetooptic effects and by materials that modulate light by surface deformation. SLMs have found numerous applications in the areas of optical information processing, projection displays, and electrostatic printing. See references cited in L. Hornbeck, 128×128 Deformable Mirror Device, 30 IEEE Tran. Elec. Dev. 539 (1983). In particular, phase-only filtering operations are used for image correlation as described in J. Horner et al, Phase-Only Matched Filtering, 23 Appl. Opt. 812 (1984) and J. Horner et al, Two-Bit Correlation, 24 Appl. Opt. 1889 (1985).

An SLM type which may be fabricated in both one and two dimensional arrays is the deformable mirror. Deformable mirrors may be subdivided into three classes: elastomers, membranes, and cantilever beams. In the elastomer approach a metallized elastomer is addressed by a spatially varying voltage that produces surface deformation through compression of the elastomer. Because of the address voltage requirements in the order of one or two hundred volts, the elastomer is not a good candidate for integration with a high-density silicon address circuit. See, generally, A. Lakatos and R. Bergen, TV projection display using an amorphous-Se-type RUTICON light valve, 24 IEEE Tran. Elec. Dev. 930 (1977).

Membrane deformable mirrors come in a variety of types. One type is essentially a substitute for the oil film of the Eidophor system discussed above. In this system a thin reflective membrane is mounted to the faceplate of a cathode ray tube (CRT) by means of a support grid structure. Addressing is by a raster scanned electron beam as with the Eidophor. The charge deposited on the glass face-plate of the CRT by the electron beam electrostatically attracts the membrane which is held at a constant voltage. This attractive force causes the membrane to sag into the well formed by the grid structure, thereby forming a miniature spherical mirror at each modulated pixel location. The light diffracted from this type of modulated pixel is concentrated into a relatively narrow cone that is rotationally symmetric about the specularly reflected beam. This type of light valve is thus used with a schlieren stop that consists of a single central obscuration positioned and sized so as to block the image of the light source that is formed by the optical system after specular reflection from unmodulated areas of the light valve. Modulated pixels give rise to a circular patch of light at the schlieren stop plane that is larger than the central obscuration, but centered on it. The stop efficiency, or fraction of the modulated pixel energy that clears the schlieren stop, is generally somewhat lower for projectors based on deformable membranes than it is for the oil film Eidophor projector. Further, such membrane deformable mirror systems have at least two major problems. High voltages are required for addressing the relatively stiff reflective membrane, and slight misalignments between the electron beam raster and the pixel support grid structure lead to addressing problems. Such misalignments would cause image blurring and nonuniformity in display brightness.

Another type of membrane deformable mirror is described in L. Hornbeck, 30 IEEE Tran. Elec. Dev. 539 (1983) and U.S. Pat. No. 4,441,791 and is a hybrid integrated circuit consisting of an array of metallized polymer mirrors bonded to a silicon address circuit. The underlying analog address circuit, which is separated by an air gap from the mirror elements, causes the array of mirrors to be displaced in selected pixels by electrostatic attraction. The resultant two-dimensional displacement pattern yields a corresponding phase modulation pattern for reflected light. This pattern may be converted into analog intensity variations by schlieren projection techniques or used as the input transducer for an optical information processor. However, the membrane deformable mirror has manufacturability problems due to the susceptibility to defects that result when even small, micron sized particles are trapped between the membrane and the underlying support structure. The membrane would form a tent over these trapped particles, and the lateral extent of such tents is much larger than the size of the particle itself, and these tents would in turn be imaged as bright spots by a schlieren imaging system.

A cantilever beam deformable mirror is michromechanical array of deformable cantilever beams which can be electrostatically and individually deformed by some address means to modulate incident light in a linear or areal pattern. Used in conjunction with the proper projection optics, a cantilever beam deformable mirror can be employed for displays, optical information processing, and electrophotographic printing. An early version with metal cantilever beams fabricated on glass by vacuum evaporation appears in U.S. Pat. No. 3,600,798. This device has fabrication problems which include the alignment of the front and back glass substrates arising from the device's nonintegrated architecture.

A cantilever beam deformable mirror device is described in R. Thomas et al, The Mirror-Matrix Tube: A Novel Light Valve for Projection Displays, 22 IEEE Tran. Elec. Dev. 765 (1975) and U.S. Pat. Nos. 3,886,310 and 3,896,338. This device is fabricated as follows: a thermal silicon dioxide layer is grown on a silicon on sapphire substrate; the oxide is patterned in a cloverleaf array of four cantilever beams joined in the middle. The silicon is isotropically wet etched until the oxide is undercut, leaving within each pixel four oxide cantilever beams supported by a central silicon support post. The cloverleaf array is then metallized with aluminum for reflectivity. The aluminum which is deposited on the sapphire substrate forms a reference grid electrode which is held at a DC bias. The device is addressed by a scanning electron beam which deposits a charge pattern on the cloverleaf beams causing the beams to be deformed by electrostatic attraction towards the reference grid. Erasure is achieved by negatively biasing a closely spaced external grid and flooding the device with low-energy electrons. A schlieren projector is used to convert the beam deformation into brightness variations at the projection screen. A significant feature of this device is the cloverleaf geometry which leads to beam deflection in a direction rotated forty-five degrees from the openings between the beams; this permits use of a simple cross shaped schlieren stop to block out the fixed diffraction background signal without attenuating the modulated diffraction signal. The device was fabricated with a pixel density of five hundred pixels per inch with beams deflectable up to four degrees. The optics employed a 150 watt xenon arc lamp, reflective schlieren optics and a 2.5 by 3.5 foot screen with a gain of five. Four hundred TV lines of resolution were demonstrated with a screen brightness of thirty-five foot-lumens, a contrast ratio of fifteen to one, and a beam diffraction efficiency of forty-eight percent. Write times of less than 1/30 second were achieved and erase times were as short as 1/10 of the write time. However, the device has problems, including degradation of resolution from scanning errors, poor manufacturing yield, and no advantage over conventional projection cathode ray tubes. That is, the scan-to-scan positioning accuracy is not high enough to reproducibly write on individual pixels. The resulting loss of resolution forces at least a four fold increase in the number of pixels required to maintain the same resolution compared to comparably written phosphor. Also, the device yield is limited by the lack of an etch stop for the cloverleaf support post, the wet etching of the beams leading to beam breakage, and the need to evaporate normally tensile aluminum in a state of zero stress on the oxide beams. Further, the device offers no apparent cost or performance advantage over conventional projection CRTs.

Cantilever beam deformable mirrors integrated on silicon with addressing circuitry, thus eliminating the electron beam addressing with its high voltage circuitry and vacuum envelopes of the previously described cantilever device, appear in K. Petersen, Micromechanical Light Modulator Array Fabricated on Silicon, 31 Appl. Phys. Lett. 521 (1977) and U.S. Pat. No. 4,229,732. The first of these references describes a 16 by 1 array of diving board-shaped cantilever beams fabricated as follows: an epitaxial layer of (100)-oriented silicon (either p or n) of thickness of about 12 microns is grown on a p+ substrate (or buried layer); the epilayer is oxidized to a thickness of about 0.5 micron and covered with a Cr-Au film of thickness about 500 Å. The Cr-Au is etched away to form contact pads and address lines and to define the diving board metallization. The oxide is etched away in a comb pattern around the metallization in a second masking step. Finally, the silicon itself is etched in a solution of ethylenediamine and pyrocatechol at 120 degrees C. If the proper orientation of the mask with respect to the crystalline axes is maintained, the metal-coated oxide diving boards will be undercut by the etch and freed from the silicon. Since the etch is anisotropic, further lateral etching will be stopped by the (111) planes defining the rectangular envelope of the comb pattern. In addition, the etchant is inhibited by p+ material, so the depth of the well beneath the diving boards is defined by the thickness of the epilayer. When a dc voltage is applied between the substrate and the diving board metallization, the thin oxide diving board will be electrostatically deflected downward into the etched well. Diving boards of length 106 microns and width 25 microns showed a threshold voltage of about 66 volts.

The second reference (U.S. Pat. No. 4,229,732) describes devices fabricated in a manner similar to the diving board device (a buried p+ layer as an etch stop for forming the wells underneath metallized silicon dioxide cantilever beams) but has a different architecture; namely, the cantilever beams are in the shape of square flaps hinged at one corner, the flaps form a two dimensional array instead of the one dimensional row of diving boards, and the wells underneath the flaps are not connected so that addressing lines for the flaps may be formed on the top surface of the silicon between the rows and columns of flaps. Of course, the corner hinging of the flaps derives from the cloverleaf architecture of U.S. Pat. Nos. 3,886,310 and 3,896,338, but the full cloverleaf architecture could not be used because this would preclude the surface addressing lines since cloverleaf flaps are hinged to a central post isolated from the silicon surface. Further, these devices have problems including poor resolution and low efficiency due to density limitations and the small fractional active area, low manufacturing yield, degradation of contrast ratio due to diffraction effects from the address circuitry, and residual image due to the charging effects of the oxide flap. More particularly, the addressing circuitry is squeezed around the active area (flaps) because no option exists for placing the address circuitry under the active area due to the wells being formed by etching away the epilayer down to the p+ etch stop. Thus the active area is reduced substantially together with the diffraction efficiency. This means more lamp power is required for the same screen brightness. Because the address circuitry requires additional area, the pixel size is increased far beyond the flap area with a resulting decrease in achievable resolution. The wet etching required to form the wells leads to low electrical and mechanical yield; indeed, wet cleanups, such as after dicing into chips, destroy flaps and diving boards because during the spin-rinse/dry cycle the water trapped under the beam breaks the beam as it is spun from the surface. If the water is instead evaporated from the surface it leaves behind surface residues which can increase surface leakage currents contributing to erratic device operation. Also, the addressing circuitry being on the silicon surface is exposed to the incident light to be modulated and creates unwanted diffraction effects from the transistor gates plus lowers the contrast ratio. In addition, light leakage into the address structure produces photogenerated charge and reduces storage time. Lastly, the oxide/metal flap has the insulating side facing the well and will charge up due to the intense electric fields which exist across the well; this produces a residual ("burn-in") image. The AC drive required to eliminate this residual image problem cannot be supplied by the NMOS drive circuitry described. Further, if the flap is deflected past the maximum stable deflection, then it will collapse and stick to the bottom of the well. Thus, voltages over the collapse voltage must be absolutely avoided.

A variation of the cantilever beam approach appears in K. Petersen, Silicon Torsional Scanning Mirror, 24 IBM J. Res. Devp. 631 (1980) and M. Cadman et al, New Micromechanical Display Using Thin Metallic Films, 4 IEEE Elec. Dev. Lett. 3 (1983). This approach forms metallic flaps which are connected to the surrounding reflective surface at two opposed corners and operate by twisting the flaps along the axes formed by the connections. The flaps (torsion beams) are not formed monolithically with the underlying addressing substrate, but are glued to it in a manner analogous to the deformable membrane devices mentioned above.

More recent versions of the cantilever beam and torsion beam approach appear in Hornbeck, U.S. Pat. Nos. 4,566,935, 4,710,732, 4,596,992, 4,615,595, and 4,662,746.

J. M. Florence et al, Operation of a Deformable Mirror Device as a Fourier Plane Phase Modulating Filter, 938 Proc. SPIE 1 (April 1988), discusses the use of SLMs for phase-only filtering operations for image correlation. However, the known membrane, cantilever beam and torsion beam SLMs when used for phase modulation have problems including amplitude change due to the change in direction of light after reflection, poor optical efficiency, and non-active background reflection.

Micromechanical devices in silicon such as vibration sensors and microvalves have been fabricated in the form of a disk suspended by two spiral arms; see Electronics/May 17, 1984 at pages 83–84 reporting on work done at the Fraunhofer Institute for Solid State Technology.

SUMMARY OF THE INVENTION

The present invention provides deflectable beam spatial light modulators with arrays of pixels in the preferred embodiments including square mirror elements hinged on all four sides for movement perpendicular to the mirror plane. The mirror elements may be closed packed with the hinges of adjacent mirror elements on a common support.

The problems of amplitude change due to the change of direction of reflected light, poor optical efficiency, and non-active background reflection of the known deflectable beam spatial light modulators for phase modulation are solved by the perpendicular mirror element movement.

DESCRIPTION OF THE PREFERRED EMBODIMENTS

The preferred embodiment deflectable beam spatial light modulators (SLM) are formed of linear or area arrays of pixels, each pixel individually addressable and containing at least one deflectable reflecting mirror element; the pixels are organized in the form of monolithic silicon based chips. The chips are fabricated by processing silicon wafers, dicing the wafers into chips, followed by processing of the individual chips. The chips will vary in size depending upon the application; for example, a 128 by 128 area array of pixels as would be used in a phase-only filter may be fabricated on a chip about 300 mils by 300 mils with pixels about 50 microns square. The SLMs operate by reflecting light off of the mirror elements, and the reflected light is modulated by varying the deflection of the mirror elements. Such SLMs are consequently also called deformable mirror devices (DMDs). The following descriptions are primarily of the individual pixels for a DMD, and all of the drawings are schematic for clarity of explanation.

Figure 1A:
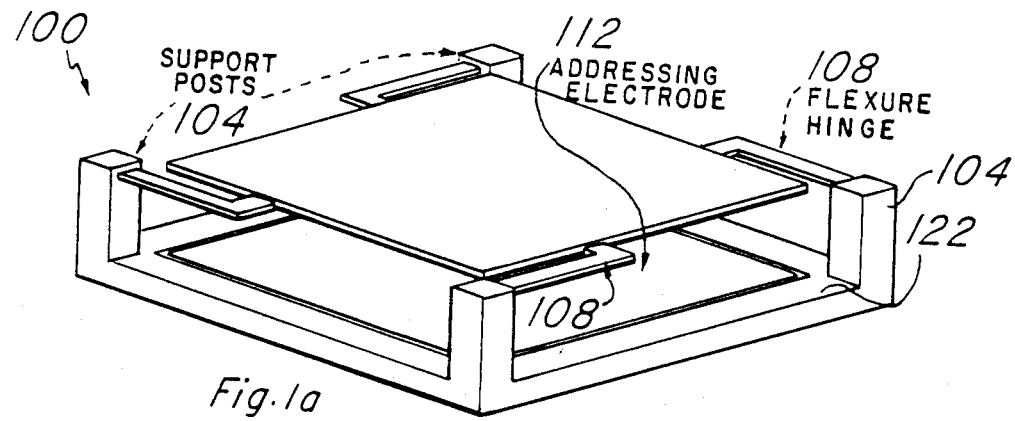
FIGS. 1a–c illustrate in perspective, cross sectional elevation, and plan views a first preferred embodiment pixel.
Figure 1B:
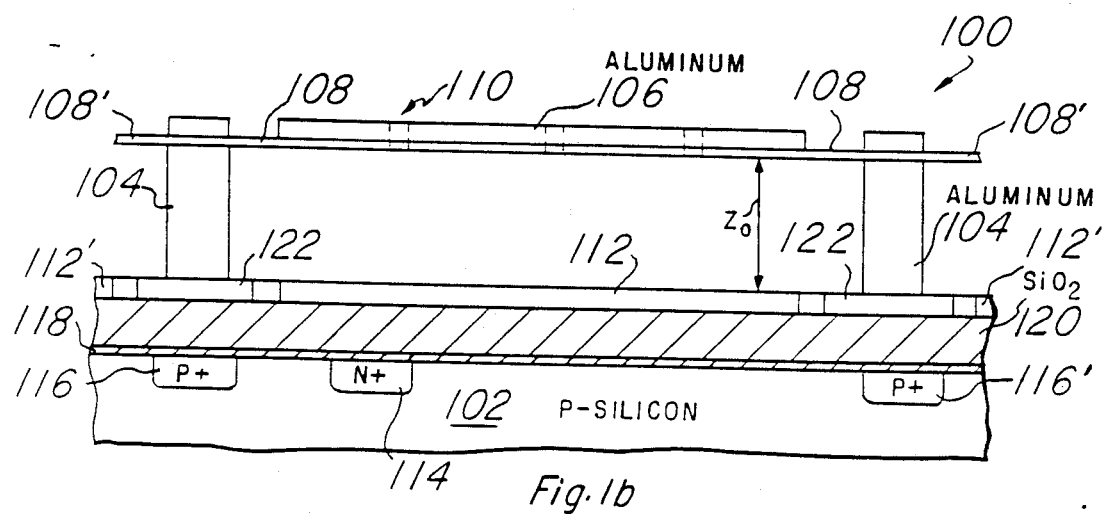
Figure 1C:
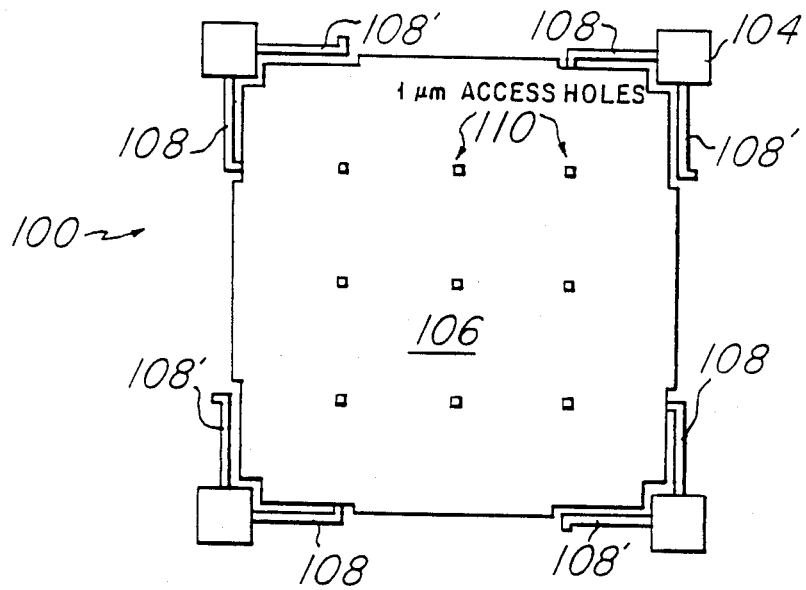

A first preferred embodiment single pixel of a DMD fabricated by a first preferred embodiment method is illustrated in perspective view in FIG. 1a, in cross sectional elevation in FIG. 1b, and in plan view in FIG. 1c. The pixel, generally denoted 100, is basically a square plate supported on posts and located over an addressing electrode and includes $p^-$ silicon substrate 102, aluminum support posts 104, aluminum square plate 106, aluminum hinges 108, plasma etch access holes 110 in plate 106, tungsten addressing electrode 112, $n^+$ diffused bitline 114 in substrate 102, $p^+$ diffused channel stops 116 in substrate 102, gate oxide layer 118, and silicon dioxide layer 120. FIGS. 1b–c also indicate the hinges 108' and electrodes 112' for adjacent plates of an array.

Typical dimensions for pixel 100 would be as follows: plate 106 is a square of sides 49 microns long with indentations near hinges 108 and support posts 104 as illustrated in FIG. 1c, plate 106 is 5,000 Å thick, posts 104 are 6 microns square and 4 microns tall (vertical in FIG. 1b), hinges 108 are 1,200 Å thick and 1 micron wide and 10 microns long, plasma etch access holes 110 are 1 micron square, the space between adjacent plates in an array is 1 micron.

Figure 4A:
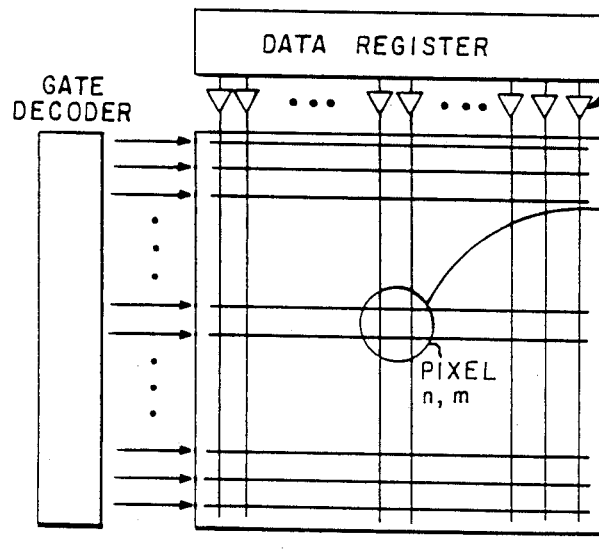
FIGS. 4a–e cross sectional and plan views of the first preferred embodiment pixel in an array of pixels.
Figure 4F:
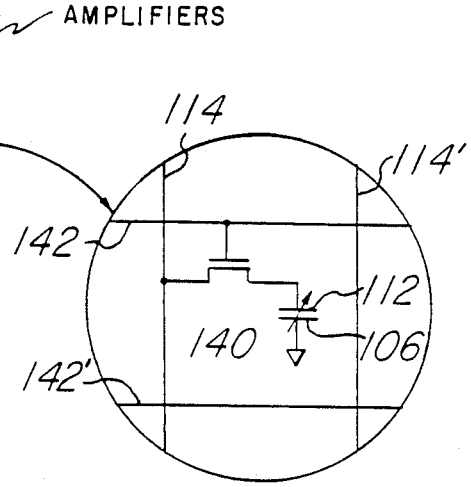

Substrate 102 is (100) silicon with resistivity about 10 ohm-cm and typically will have addressing circuitry formed on its surface, although such circuitry is only partially shown in FIGS. 1a–c for clarity; see FIG. 4a for a cross sectional elevation view illustrating a portion of such circuitry. Hinges 108 and plate 106 and posts 104 are all an aluminum, titanium, and silicon alloy (Ti:Si:Al) with 0.2% Ti and 1% Si. Both layers making up plate 106 being the same metal minimizes stress.

Figure 2:
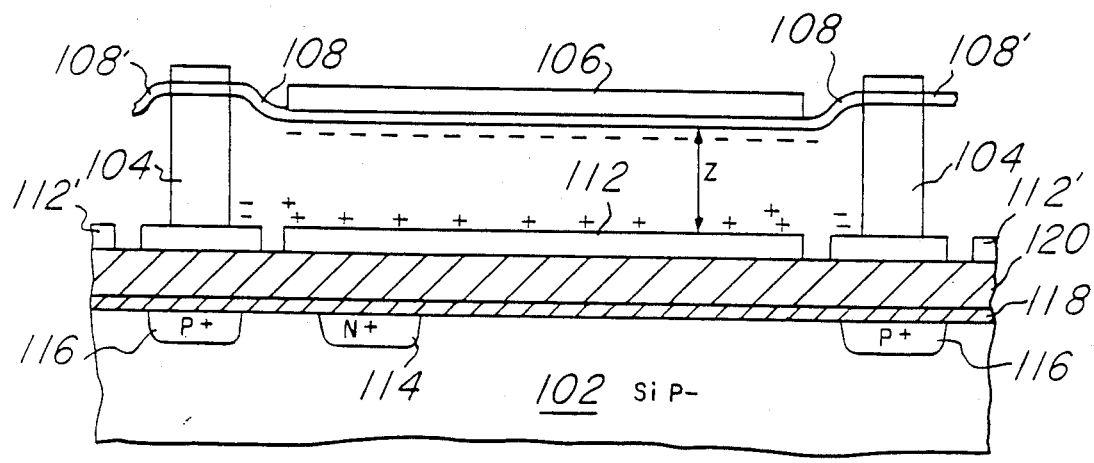
FIG. 2 illustrates mirror element deflection for the first preferred embodiment.

Pixel 100 is operated by applying a voltage between metal plate 106 and electrode 112 on substrate 102; plate 106 and electrode 112 form the two plates of an air gap capacitor and the opposite charges induced on the two plates by the applied voltage exert electrostatic force attracting plate 106 to electrode 112. This attractive force causes hinges 108 to bend and plate 106 deflects towards electrode 112. The four hinges 108 holding plate 106 are symmetrically disposed about plate 106 and have the same compliance (within processing limits) which leads to a uniform deflection of plate 106; see FIG. 2 for a simplified, exaggerated view of this deflection with an indication of the charges concentrated at the regions of smallest gap. For voltages in the range of 7 to 13 volts, the deflection is in the range of 1,600 to 3,200 Å. Of course, if hinges 108 were made longer or thinner or narrower, the deflection would increase as the compliance of hinges 108 varies linearly with the inverse of its width and directly with the square of its length and inversely with the cube of its thickness. Note that the thickness of plate 106 prevents significant warping of plate 106 due to surface stress generated during processing, but that the thinness of hinges 108 allows for large compliance.

The deflection of plate 106 is a highly nonlinear function of the applied voltage because the restoring forge generated by the bending of hinges 108 is approximately a linear function of the deflection but the electrostatic force of attraction increases as the square of the reciprocal of the distance z between plate 106 and electrode 112 (recall that the capacitance increases as the distance decreases so the induced charges both increase in quantity and get closer together). Explicitly, the energy stored in the capacitor formed by plate 106 and electrode 112 is approximately:

$$W = \frac{1}{2} CV^2 = \frac{1}{2} \frac{A\epsilon}{z} V^2$$

where A is the area of plate 106, and $\epsilon$ is the permittivity of the gas between plate 106 and electrode 112. Differentiating with respect to z gives the electrostatic attractive force acting on plate 106 as a function of separation distance. Similarly, the restoring force provided by each hinge 108 is approximately (fixed-ends beam model):

$$F = \frac{8(z_0 - z)Ewt^3}{l^3}$$

where $z_0$ is the distance between undeflected plate 106 and electrode 112, E is the modulus of elasticity of the hinge material (aluminum:titanium:silicon alloy), w is the hinge width, t is the hinge thickness, and l is the hinge length.

Figure 3A:
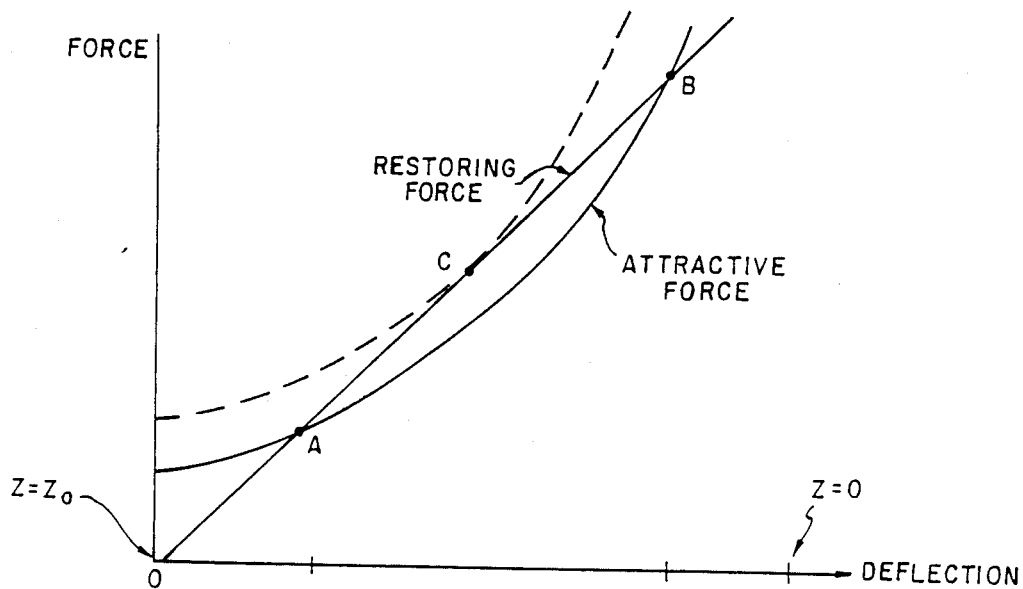
FIGS. 3a–b show the dependence of deflection upon applied voltage.

FIG. 3a illustrates the electrostatic attractive force and the hinge restoring force as a function of deflection for a fixed applied voltage V. As is apparent from FIG. 3a, there is a stable deflection (corresponding to point A) at which the attractive and restoring forces just balance; any perturbation to a larger deflection causes the restoring force to exceed the attractive force and reverse the perturbation, and any perturbation to a smaller deflection causes the attractive force to exceed the restoring force and again reverse the perturbation. Conversely, if plate 106 is moved past the stable deflection until the attractive force exceeds the restoring force (point B in FIG. 3a), then plate 106 will continue deflecting and collapse to electrode 112.

Figure 3B:
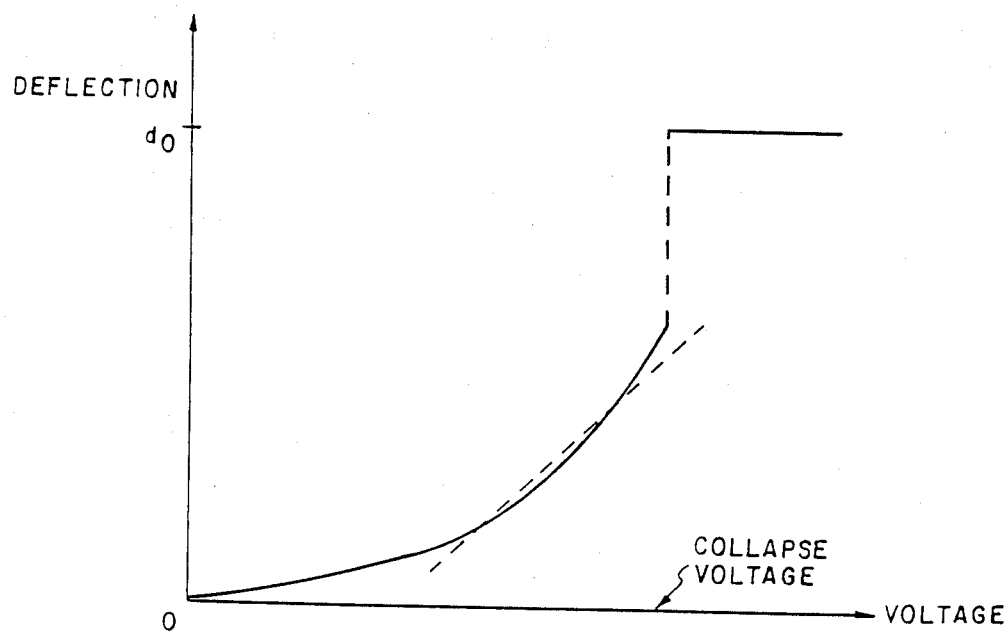

As the voltage is increased, the attractive force curve moves up until it becomes tangent to the restoring force curve (dashed curve and point C in FIG. 3a), and the stable deflection disappears. At this voltage plate 106 collapses to electrode 112 even from a starting undeflected position. This voltage is termed the collapse voltage. FIG. 3b illustrates the dependence of deflection on voltage; the voltage at which plate 106 becomes unstable and deflects all the way to touch electrode 112 is, of course, the collapse voltage. For voltages somewhat less than the collapse voltage the deflection is approximately a linear function of the voltage (see the dotted line in FIG. 3b) and this provides an analog operating region.

Figure 4C:
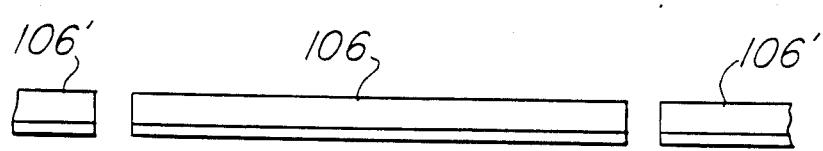
Figure 4C:
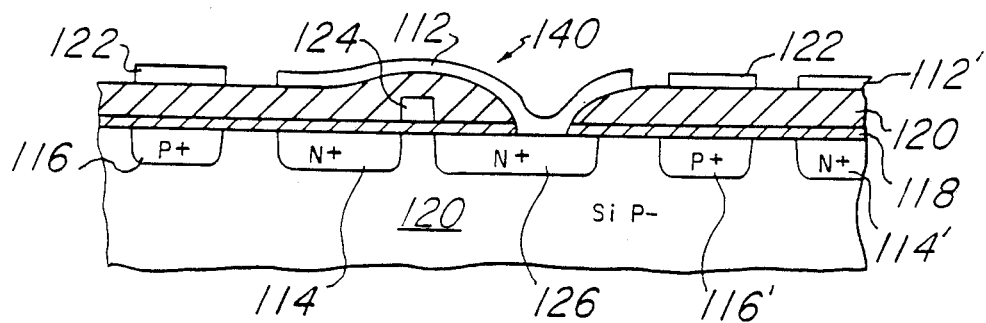
Figure 4B:
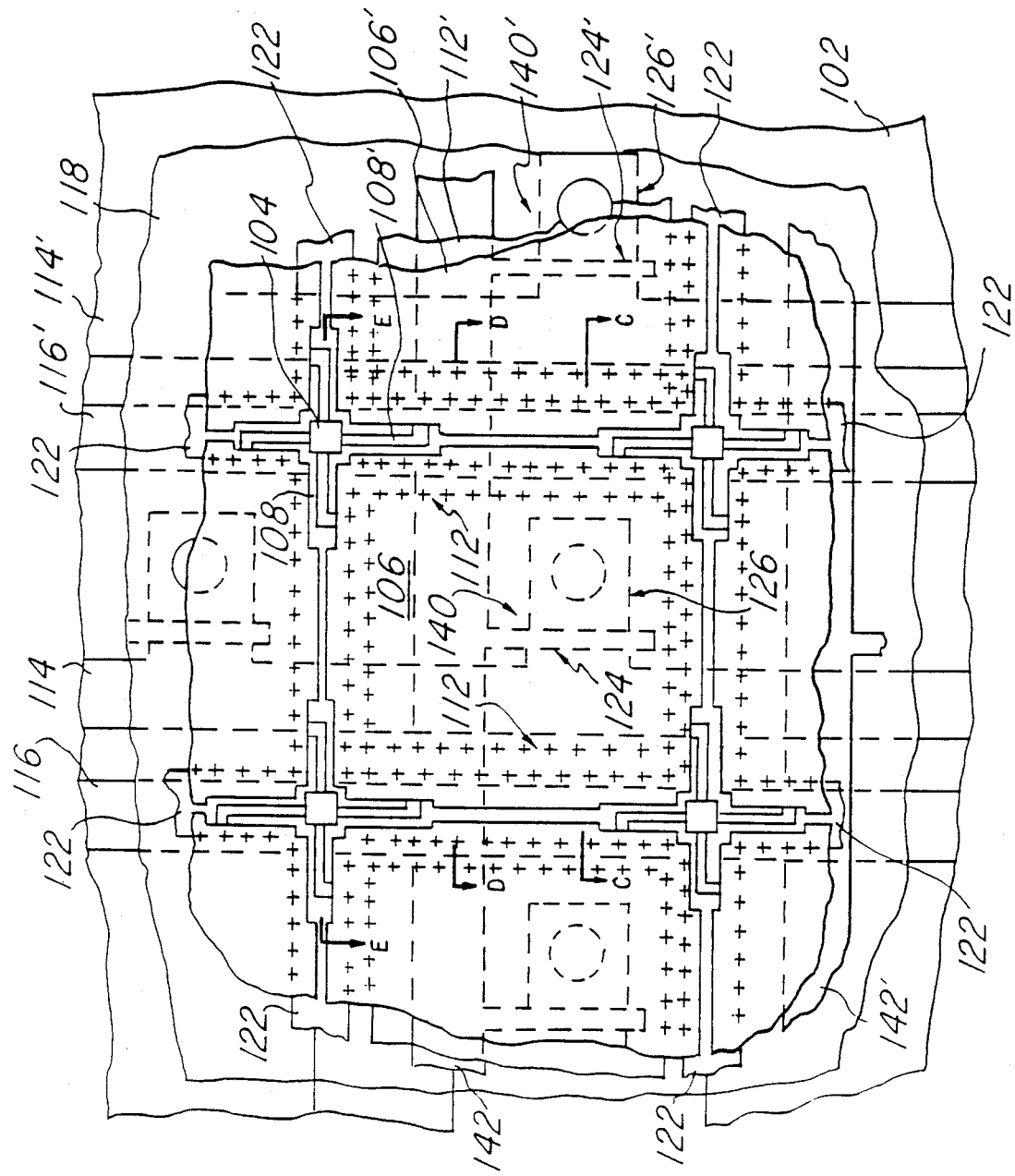
Figure 4D:
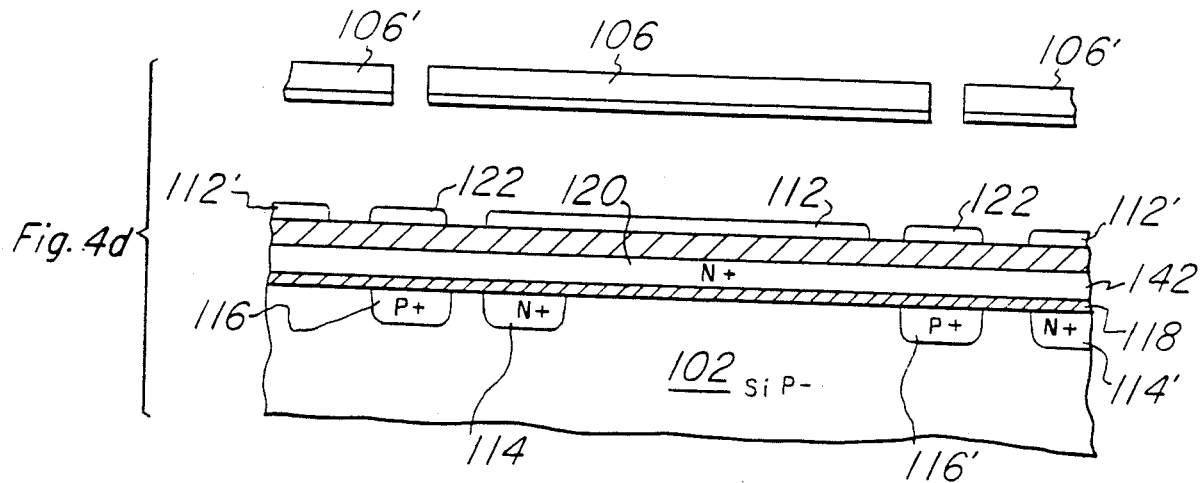
Figure 4E:
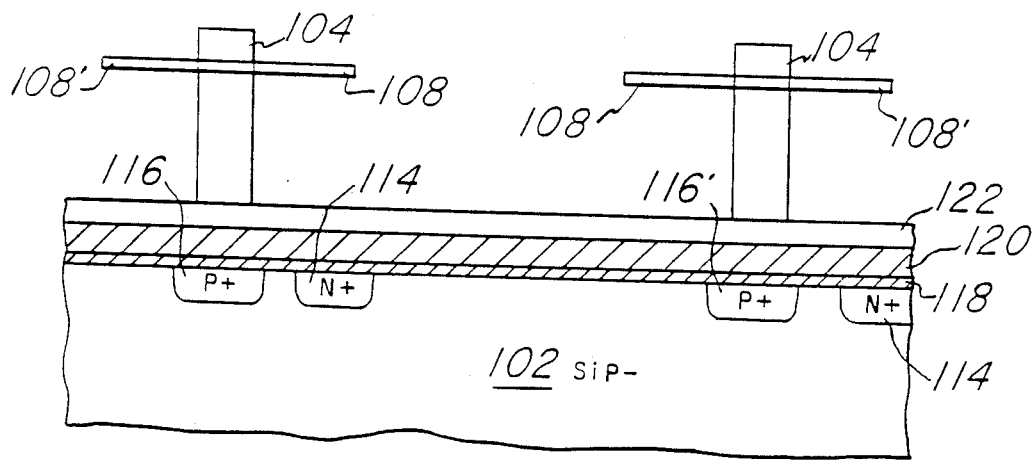
Figure 5A:
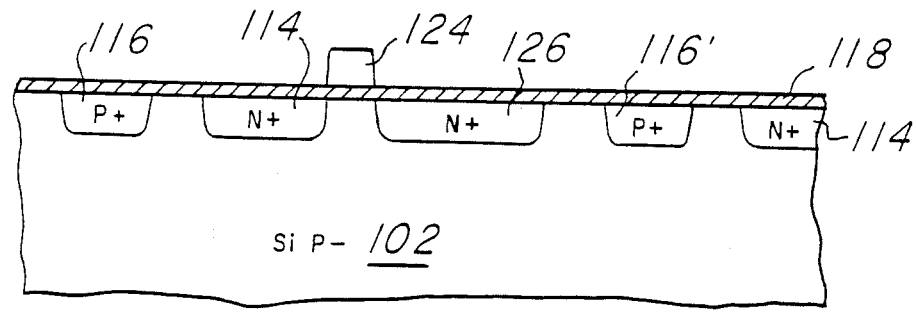
FIGS. 5a–d illustrate in cross sectional view the steps of the first preferred embodiment method of fabrication.
Figure 5B:
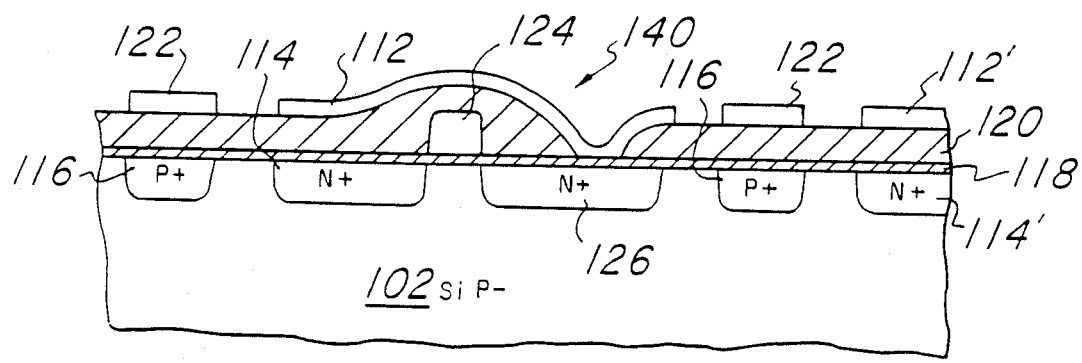
Figure 5C:
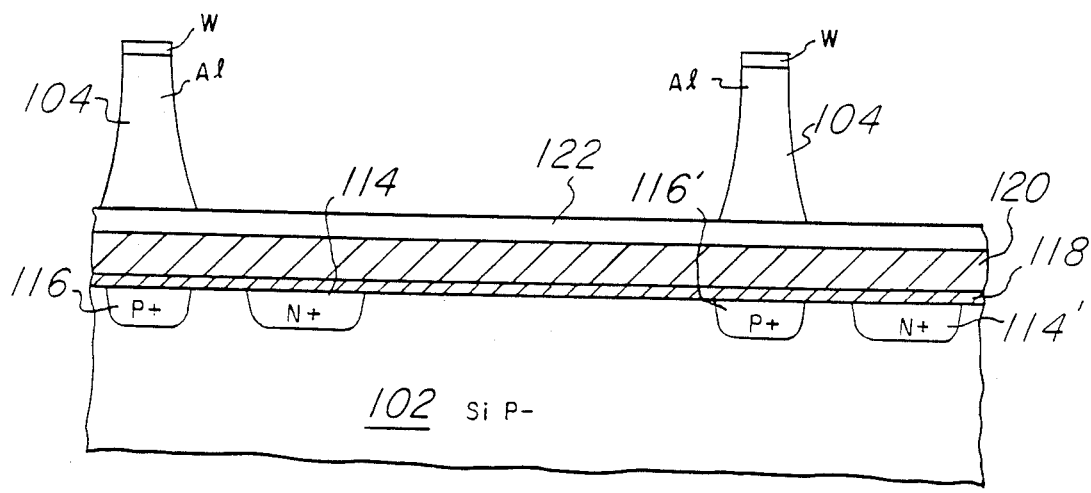
Figure 5D:
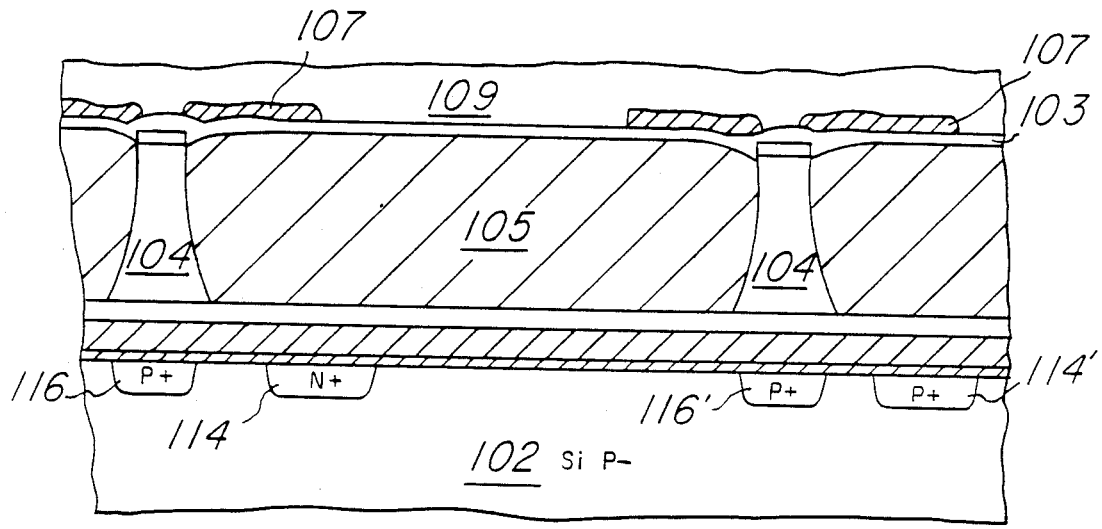

The addressing of individual pixels arranged in an area array DMD is illustrated in FIGS. 4a–e: FIG. 4a is a schematic plan view of the DMD showing the bitlines and gate lines, FIG. 4b is a plan view showing the pixels and addressing circuitry, and FIGS. 4c–e are cross sectional views along line C—C, D—D, and E—E of FIG. 4b. As indicated in FIG. 4a, each pixel of the area array DMD is a variable capacitor formed by plate 106 (grounded) and electrode 112; the $(n,M)^{th}$ pixel is addressed (the capacitor is charged (or discharged) to a desired voltage) by connecting electrode 112 to bitline 114 at the desired voltage through MOSFET 140. MOSFET 140 is controlled by the voltage applied to gate line 142, and after the capacitor is charged as desired, MOSFET 140 is turned off and electrode 112 floats. This method of charging or discharging the capacitor permits all the pixels in a row of the DMD to by simultaneously addressed.

FIG. 4b is a plan view of the $(n,m)^{th}$ pixel plus portions of adjacent pixels showing the locations of electrodes 112, 112', ... bitlines 114 and 114', gate lines 142 and 142', channel stops 116 and 116', ... and MOSFETs 140, 140', ...

FIGS. 4c–e show channel stops 116, 116', ... and p+ implanted regions in p− silicon substrate 102 and isolate the columns of pixels, bitlines 114, 114', ... and n+ implanted regions of substrate 102 form the drains of MOSFETs with polysilicon gates 124, 124', ... and sources 126, 126', ... which are n+ implanted regions of substrate 102. Gate lines 142, 142', ... and gates 124, 124', ... are formed from n+ polysilicon on gate oxide 118. Gate oxide 118 covers all of substrate except for openings where electrodes 112, 112', ... make contact to sources 126, 126', .... Planarized silicon dioxide 120 insulates tungsten electrodes 112, 112', ... and ground plane 122 from the substrate and gates. Support posts 104 are located on and grounded by ground plane 122.

The steps of first preferred embodiment method of fabrication of pixel 100, including addressing electrode 112 on substrate 102, are illustrated in cross sectional elevation view in FIGS. 5a–d as follows.

(a) Begin with a <100> oriented p− silicon substrate 102 and grow 200 Å of thermal oxide 118. Deposit 5,000 Å of n+ polysilicon by LPCVD, and photolithographically pattern and etch the polysilicon to form gate lines 142, 142', ... and gates 124, 124', .... Form a photoresist implant mask for the bitlines 114, 114', ... and source regions 126, 126', ... and implant arsenic through gate oxide 118 to form the bitlines and sources; note that gates 124 are also used as part of the implant mask so that the MOSFETs 140 formed are self-aligned. Strip the photoresist and form a second photoresist implant mask for channel stops 116, 116', ... and implant boron to form the channel stops. Strip the second photoresist; see FIG. 5a which corresponds to the section shown in FIG. 4c.

(b) Deposit phosphorus-doped silicon dioxide (PSG) 120, and photolithographically pattern and etch an opening in oxides 120 and 118 at each source 126, 126', ... Reflow the PSG to slope the walls of the opening in the oxides. Sputter deposit 3,000 Å of Ti:W (10% titanium, 90% tungsten) on oxide 120, and photolithographically pattern and plasma etch the Ti:w in flurine to define electrodes 112, 112', ... and ground plane 122. See FIG. 5b which shows the same section as FIG. 5a.

(c) Sputter deposit four microns of Ti:Si:Al (0.2% Ti and 1% Si) and 500 Å of tungsten on the aluminum alloy. Photolithographically pattern and etch the tungsten to define the location of posts 104. Etch the aluminum alloy with chlorine using the patterned tungsten as the etch mask to form posts 104; see FIG. 5c which corresponds to the section shown in FIG. 4e. Note that the slope of the sidewalls of posts 104 are determined by the anisotropy of the aluminum alloy etch.

(d) Spin on four microns of planarizing photoresist 105 and expose and develop a pattern to uncover posts 104. Bake resist 105 and sputter deposit 1,200 Å of Ti:Si:Al (0.2% Ti and 1%) 103 and deposit 1,500 Å of silicon dioxide 107 by PeCVD. Photolithographically pattern and etch oxide 107 to define the location of hinges 108, 108', ... Sputter deposit 3,800 Å of Ti:Si:Al (0.2% Ti and 1% Si) 109. The depositions should be at a substrate temperature as near to room temperature as possible to minimize thermal expansion mismatches. This alloy of aluminum minimizes the hillocking arising in deposition of pure aluminum. See FIG. 5d which shows the same section as FIG. 5c.

(e) Spin on photoresist and expose and develop it to define plasma etch holes 110 and plasma etch access gap plur hinges 108. Patterned photoresist is then used as the mask for plasma etching the metal layers with the oxide hinge etch stop preventing the etching of the portion of hinge layer that becomes hinges 108, 108', ... The plasma etch of the aluminum alloy may be with a chlorine/boron trichloride/carbon tetrachloride etch gas mixture. Note that the hinge thickness is determined by the thickness of the deposited layer, the hinge width and length are determined by the width and length of the oxide etch stop 107; thus the compliance of hinge 108 may be adjusted by different process parameters.

(f) One and a half microns of PMMA (polymethyl methacrylate) is spun on as a protective layer during subsequent steps, and substrate 102 is diced into chips (each chip to become a DMD). PMMA is dissolved by spraying with chlorobenzene and immediately centrifuging; note that resist does not dissolve in chlorobenzene. Thus the dicing debris is removed without plate 106 being directly exposed to the debris. Lastly, resist is isotropically plasma etched in oxygen, with a few percent fluorine (such as from $CF_4$ or $NF_4$) to remove the exposed portion of the etch stop.

MODIFICATIONS AND ADVANTAGES

Figure 6:
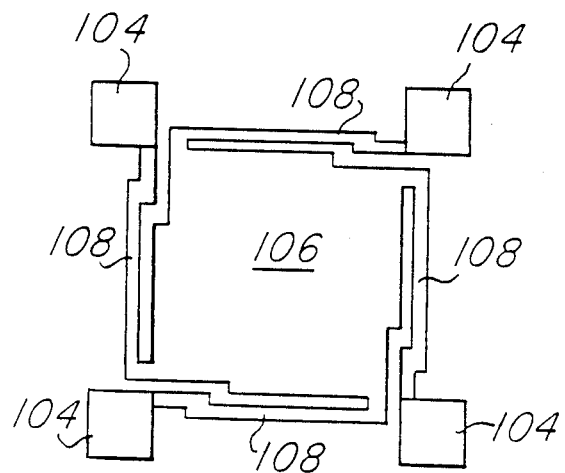
FIG. 6 shows alternative geometry.

Various modifications of the preferred embodiment devices and methods may be made while retaining the perpendicular deflection feature. For example, the dimensions and shapes can be varied such as the hinge length, width, and thickness, the size of the plates and their thickness, the height and thickness of the posts, the number of posts, the number of adjacent plates supported by a single post, and so forth. Even the geometry of the plates and hinges can be varied as shown in FIG. 6. Note that the roughly square plates provide a good fill factor, and that roughly triangular plates would lessen the fill factor for comparable hinge arrangements. Also, the materials can be varied such as Cu:Al for the metal, differing semiconductors for the substrate and the electrodes or metal electrodes, and so forth. The etch stop could be a different material, such as tungsten; and processing could result in no etch stop remnants between the hinge metal and the beam metal.

What is claimed is:

1. A spatial light modulator, comprising:
   (a) a plurality of pixels;
   (b) each of said pixels including
      i. an electrostatically deflectable reflecting element over an addressing electrode, and
      ii. a plurality of supports for said element, said supports constraining deflection of said element to positions parallel to an undeflected position.

2. The spatial light modulator of claim 1, further comprising:
   (a) a plurality of posts with each of said supports connecting one of said elements to one of said posts.

3. The spatial light modulator of claim 2, wherein:
   (a) each of said elements is a roughly square plate; and
   (b) each of said plates corresponds to four of said supports.

4. The spatial light modulator of claim 2, wherein:
   (a) said elements are made of an aluminum alloy.

5. The spatial light modulator of claim 2, further comprising:
   (a) a semiconductor body containing addressing circuitry, said addressing electrodes over said addressing circuitry, said posts affixed to but insulated from said body.

6. The spatial light modulator of claim 5, further comprising:
   (a) interconnections on the same level as said addressing electrodes and interconnecting said posts.

* * * * *